United States Patent [19]
Brandt

[11] 3,838,339
[45] Sept. 24, 1974

[54] LOGIC TEST PROBE AND INDICATOR CIRCUIT

[75] Inventor: William F. Brandt, Des Plaines, Ill.

[73] Assignee: GTE Automatic Electric Laboratories Incorporated, Northlake, Ill.

[22] Filed: Aug. 17, 1973

[21] Appl. No.: 389,417

[52] U.S. Cl.............................. 324/133, 324/72.5
[51] Int. Cl....................... G01r 19/16, G01r 31/02
[58] Field of Search.................... 324/51, 72.5, 133; 340/248 A, 248 B, 248 C

[56] References Cited
UNITED STATES PATENTS

| | | | |
|---|---|---|---|
| 3,525,939 | 8/1970 | Cartmell | 324/72.5 X |
| 3,543,154 | 11/1970 | Gordon | 324/72.5 X |
| 3,619,775 | 11/1971 | Naylor et al. | 324/133 X |
| 3,628,141 | 12/1971 | Union et al. | 324/72.5 |
| 3,742,351 | 6/1973 | Palmer et al. | 324/72.5 |
| 3,750,015 | 7/1973 | Sheker et al. | 324/72.5 |

Primary Examiner—Gerard R. Strecker
Attorney, Agent, or Firm—R. F. Van Epps; J. V. Lapacek

[57] ABSTRACT

A test circuit for detecting low, high and open voltage levels, and dynamically changing voltage levels in a digital circuit includes a display panel and a probe provided with a plurality of indicators for signalling each of the possible level conditions sensed by the probe. The circuit also includes a current detecting circuit for providing an unambiguous indication when an open level is present. A pair of indicators provide information of the presence of dynamically changing levels while low and high level indicators provide information by way of duty cycles of the shape of the dynamic wave-form. An indicator is also provided for giving a sustained indication when an unexpected level change takes place and includes means for automatically resetting itself.

10 Claims, 1 Drawing Figure

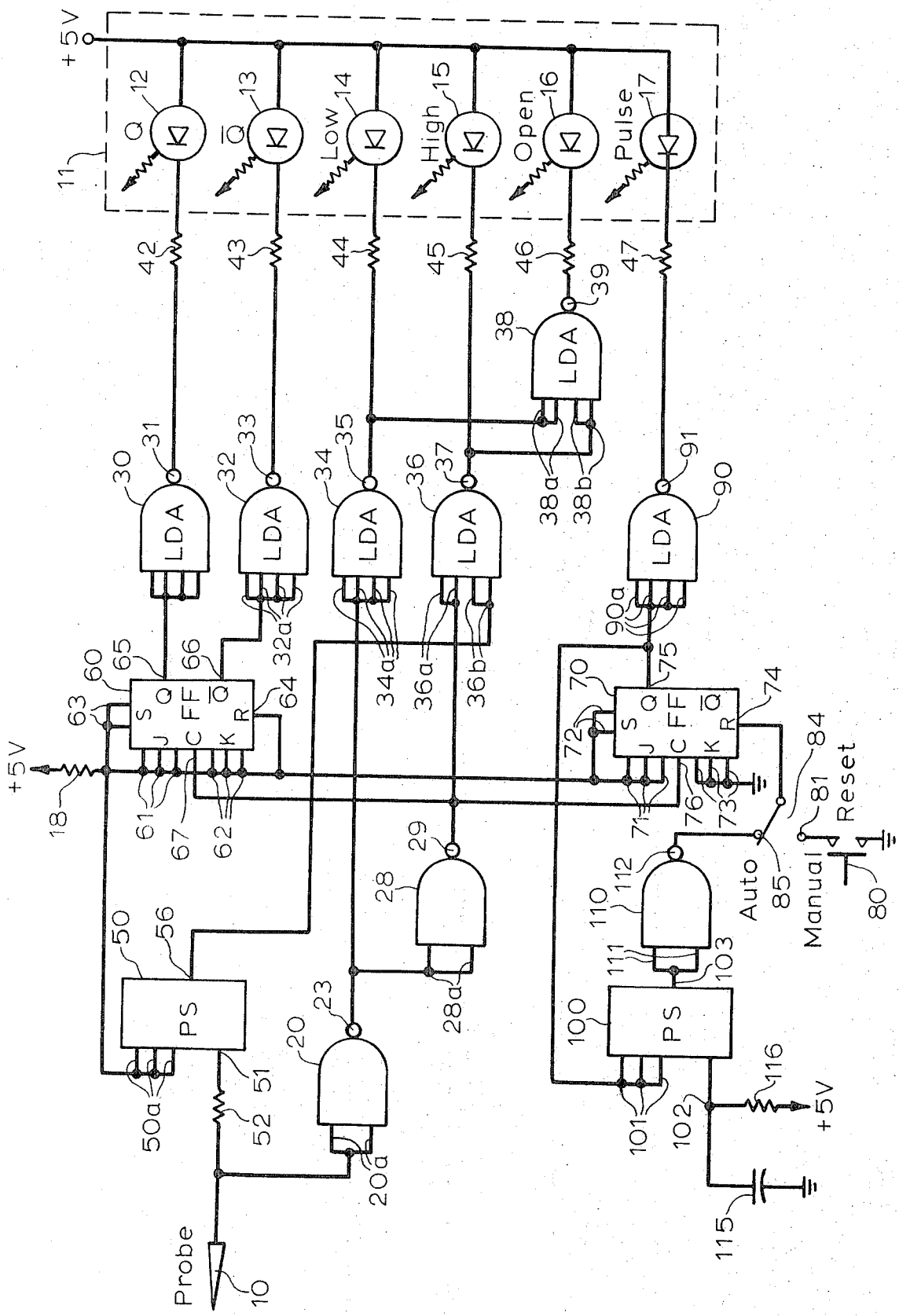

LOGIC TEST PROBE AND INDICATOR CIRCUIT

BACKGROUND OF THE INVENTION

Much of today's electronic equipment, such as a typical digital computer, is operated by binary voltage signals and is very complex. In view of this fact, complicated electronic test equipment has been required to determine if such equipment is operating correctly. Among the possible circuit conditions to be tested are static low, high and open voltage level conditions and dynamically changing voltage levels. Although prior art devices generally have been able to distinguish between and provide an indication for each of the high and low level conditions, they have been unable to provide a separate and unambiguous positive indication for an open level condition. Further, in prior test circuits dynamically changing levels are frequently read as a static condition because the circuits operate on a real time basis and the rapidly changing voltage levels are not detected by the human eye. Additionally, a test circuit should be able to provide a specific indication for unexpected voltage level changes or pulses. Heretofore the circuits have not been able to do so.

It is a general object of the present invention to provide an improved test circuit which overcomes the above disadvantages.

It is a specific object of the present invention to provide a test circuit which provides an unambiguous indication of a high level, low level and an open level condition, a separate indication for rapidly changing levels, and provides a sustained indication when an unexpected pulse occurs.

SUMMARY OF THE INVENTION

The present invention is directed to a test circuit for providing operational information for any given point of a digital circuit. It comprises an electrically conductive probe, a display panel including a low voltage level indicator, a pair of dynamic voltage indicators, and a change-of-voltage indicator. The invention further comprises a low level voltage detector coupled between the probe and the low level indicator for activating the low level indicator when the low level voltage of the digital circuit is present at the probe; a high level voltage detector coupled between the probe and the high level indicator and including means responsive to current flow through the probe activates the high level indicator when a current and a high level voltage are present. An open level control means having an input coupled to the low and high level detectors and an output coupled to the open level indicator responsive to the low and high detects when there is an absence of a low and high level at the probe. A dynamic voltage detector coupled between the probe and the dynamic level indicators activates the dynamic voltage indicators when the levels at the probe are dynamically changing and a change-of-voltage detector coupled between the probe and the change-of-voltage indicator activates and causes it to provide a sustained indication when a voltage change occurs at the probe.

DESCRIPTION OF THE DRAWING

The invention, together with further objects and advantages thereof, may best be understood by reference to the following description taken in connection with the accompanying drawings, in which the single FIGURE is a schematic block diagram of a test circuit embodying the present invention.

DESCRIPTION OF THE PREFERRED EMBODIMENT

The present invention is primarily directed to a tester for TTL digital circuitry but is also adaptable to other logic families as well. Referring now to the FIGURE, the test circuit embodying the present invention therein, represented in block schematic form comprises an electrically conductive probe 10 and a display panel 11 including a plurality of light emitting diode indicators 12 through 17.

Pulse train diodes 12 and 13 alternately flash on and off when the levels at probe 10 are dynamically changing, as when a pulse train is detected at probe 10. Low level diode 14 flashes on when there is a high level at probe 10. Open level diode 16 flashes on when there is an open level at probe 10 and random pulse diode 17 flashes on when there is a level change at probe 10.

The low level voltage detector comprises NAND NAND gate 34. NAND gate 20 has inputs 20 a which are coupled together and also coupled to probe 10. Output 23 of NAND gate 20 is coupled to the mutually coupled inputs 34a of NAND gate 34. Output 35 of NAND gate 34 is coupled through resistor 44 to low level diode 14.

The high level voltage detector comprises NAND gate 20, NAND gate 28, NAND gate 36 and pulse shaper 50. Pulse shaper 50 additionally has main inputs 50a coupled together and also coupled to the 5 volt supply through resistor 18 conditioning the main inputs into the high level. The pulse shaper responds to signals in such a way that with the three main inputs tied to a high level, a high level at auxiliary input 51 will produce a high level at output 56. Conversely a low level at input 51 will cause output 56 to obtain a low level output and the absence of current flow at auxiliary input 51 regardless of the level at input 51 will produce a low level at output 56. Therefore, pulse shaper 50 comprises a means for detecting current flow through probe 10.

NAND gate 28 has inputs 28a coupled to output 23 of NAND gate 20 and an output 29 coupled to inputs 36a of NAND gate 36. Output 56 of pulse shaper 50 is coupled to the other two mutually coupled inputs 36b of NAND gate 36. The output 37 of NAND gate 36 is coupled through resistor 45 to light emitting diode 15.

The open level voltage control means comprises NAND gate 38. Output 37 of NAND gate 36 is coupled to inputs 38b of NAND gate 38, and output 35 of NAND gate 34 is coupled to the other two mutually coupled inputs 38a of NAND gate 38. Output 39 of NAND gate 38 is coupled to light emitting diode 16 through resistor 46.

The dynamic voltage detector comprises NAND gate 20, NAND gate 28, flip-flop 60, NAND gate 30, and NAND gate 32. Flip-flop 60 has J inputs 61 and K inputs 62 tied to the 5 volt supply maintaining those inputs at the high level. Also coupled to the 5 volt supply are S inputs 63 and R inputs 64. The J and K inputs of flip-flop 60 by being coupled to a high level, set the operation of flip-flop 60 to provide alternately high and low levels at outputs 65 and 66 each time a negative going level change occurs at probe 10. Clock input 67 of flip-flop 60 is coupled to output 29 of NAND gate 28 which as previously described is coupled to the probe through NAND gate 20. Because the inputs to NAND gates 20 and 28 are coupled together, each serves the logic function of an inverter. Therefore, because there are two such NAND gates between clock input 67 and probe 10, the signal at probe 10 is inverted twice and is thus represented at clock input 67 as it originally occurs at probe 10. Q output 65 of flip-flop 60 is coupled to inputs 30a of NAND gate 30. NAND gate 30 has an output 31 coupled through resistor 42 to light emitting diode 12. Q output 66 of flip-flop 60 is coupled to the four mutually coupled inputs 32a of NAND gate 32 which has output 33 coupled through resistor 43 to light emitting diode 13.

For detecting the occurrence of an unexpected level change at probe 10, the test circuit comprises flip-flop 70 having its J inputs 71 and S inputs 72 coupled to the 5 volt supply, tying them to a high level. K inputs 73 of flip-flop 70 are coupled to ground maintaining them at a low level. R input 74 is selectively coupled to either pole 81 for manual resetting or pole 85 of switch 84 for automatic resetting. Q output 75 of flip-flop 70 is coupled to inputs 90a of NAND gate 90. Output 91 of NAND gate 90 is coupled through resistor 47 to diode 17. Clock input 76 of flip-flop 70 is coupled to output 29 of NAND gate 28 to thereby receive the level changes occurring at probe 10 in the manner previously described.

The means for resetting the unexpected pulse detecting means comprises pulse shaper 100, NAND gate 110, capacitor 115, and resistor 116. The other side of capacitor 115 is coupled to ground and the other side of resistor 116 is coupled to the 5 volt supply. Output 103 of pulse shaper 100 is coupled to inputs 111 of NAND gate 110. Output 112 of NAND gate 110 is coupled to pole 85 of switch 84.

The operation of the test circuit will now be described for each of the possible level conditions to be detected at probe 10.

LOW LEVEL CONDITION DETECTION

A low level at probe 10 is impressed upon inputs 20a of NAND gate 20. The resulting high level at output 23 is impressed upon inputs 34a of NAND gate 34 causing a low level at output 35. This low level serves as a current sink for light emitting diode 14 activating it and causing it to light, indicating the low level voltage at probe 10.

HIGH LEVEL DETECTION

A high level voltage at probe 10 will cause a low level at output 23 of NAND gate 20 which is translated to inputs 28a of NAND gate 28. Inputs 28a being mutually coupled makes NAND gate 28 serve as an inverter and the low level at inputs 28a, will cause a high level at output 29. This high level is impressed upon inputs 36a of NAND gate 36. The high level at probe 10 is also impressed upon auxiliary inputs 51 of pulse shaper 50. The high level at input 51 causes output 56 of pulse shaper 50 to attain a high level which is impressed upon inputs 36b of NAND gate 36. Because all inputs to NAND gate 36 are at the high level, output 37 of NAND gate 36 will attain the low level to thus sink current through light emitting diode 15 causing it to light, indicating the presence of the high level at probe 10.

OPEN LEVEL DETECTION

An open level voltage at probe 10 will appear to a logic gate as a high level. However, an open level is not associated with current flow.

Pulse shaper 50 of the high level voltage detector serves as a current detector to distinguish between high and open levels at probe 10. The absence of current flow at the probe associated with the open level will cause output 56 of pulse shaper 50 to attain the low level. The low level at output 56 of pulse shaper 50 is impressed upon inputs 36b of NAND gate 36. The open level at probe 10 will appear to NAND gate 20 to be a high level which results in a high level being attained at output 29 of NAND gate 28 and applied to inputs 36a of NAND gate 36. Because inputs 36a are at a high level, and inputs 36b are at a low level, output 37 of NAND gate 36 will be at a high level. This high level is impressed upon inputs 38b of NAND gate 38.

The open level at probe 10 will likewise produce a high level at output 35 of low level detector NAND gate 34 because the open level appears to NAND gate 20 as a high level. The high level at output 35 is impressed upon inputs 38a of NAND gate 38. Because all of the inputs 38a, 38b of NAND gate 38 are at the high level, output 39 will be at a low level thus sinking current through light emitting diode 16 causing it to light and to provide a positive indication of the open level at probe 10.

Resistor 52 is included between probe 10 and input 51 of pulse shaper 50 for providing current limiting at input 51 and also to provide isolation between input 51 and inputs 20a of NAND gate 20 to preclude a false indication of the presence of leakage current from NAND gate 20 when in fact there may be an absence of such current flow through probe 10.

DYNAMICALLY CHANGING LEVEL DETECTION

Dynamically changing levels at probe 10 are translated through NAND gate 20 and NAND gate 28 to input 67 of flip-flop 60. Because the J inputs 61 and K inputs 62 are coupled to the 5 volt supply, each time there is a high to low level change at probe 10, the levels at outputs 65 and 66 of flip-flop 60 will change.

For example, assuming that Q output 65 is at the high level, and output 66 is at the low level, the first negative transition received at probe 10 will cause output 65 to switch to the low level and output 66 to switch to the high level. The next negative transition at probe 10 will cause the outputs to switch back to their previous starting levels, that is, a high level at output 65 and a low level at output 66. Therefore, each time there is a high to low level change at probe 10, the flip-flop outputs 65 and 66 will reciprocally change output levels.

Because output 65 is coupled to inputs 30a of NAND gate 30, a high level at output 65 will cause output 31 of NAND gate 30 to be in the low level and to thus sink current through diode 12 causing it to light up. The other output 66, will be at the low level impressing it on inputs 32a of NAND gate 32 causing a high level at output 33. Therefore, no current will flow through diode 13 maintaining it off. When the levels at outputs 65 and 66 change, diode 12 turns off, and diode 13 lights up. Therefore, diodes 12 and 13 will alternately indicate the presence of the dynamically changing levels or pulse trains at probe 10.

While diodes 12 and 13 are indicating the presence of a pulse train at probe 10, it is of course understood that diodes 14 and 15 are also being illuminated as well. For instance, a pulse train at probe 10 which is at a low level for the majority of the time and is at the high level for only a short period of time, will cause diode 14 to be more brightly illuminated than diode 15 indicating that the pulse train is more low than high. If diodes 14 and 15 are approximately equal in brightness, it can be assumed that the pulse train is roughly a square wave.

The benefit derived from having diodes 12 and 13 responding to the levels of flip-flop 60 is that some pulse trains would be very difficult to detect by using the low level and high level indicators alone. For instance, in the case where a pulse train is predominately at a low level, diode 14 may appear to the human eye to be on all the time, and diode 15 to be off. This could easily be mistaken for a static low level condition at the probe. Because flip-flop 60 alternates light emitting diodes 12 and 13 for every pulse regardless of duty cycle, an unambiguous and readily observable indication of the presence of a pulse train is obtained. Diodes 14 and 15 augment the detection of a pulse train information as to the approximate duty cycle of the pulse train.

UNEXPECTED PULSE DETECTION

A high to low level change at the probe also turns on diode 17 which is sustained for a period of time. This is particularly useful for unanticipated pulse detection.

The pulse is translated from probe 10 to output 29 of NAND gate 28 and is impressed upon clock input 76 of flip-flop 70. With switch 84 in contact with pole 81 and input 74 of flip-flop 70 to reset to ground, Q output 75 will be in a low level condition. Because J inputs 71 are tied to the 5 volt supply establishing at the J inputs a high level, and because the K inputs 73 are tied to ground establishing at the K inputs a low level, a pulse received at clock input 76 will cause Q output 75 to assume a high level. The high level establishes at output 91 of NAND gate 90 a low level to turn on diode 17. Diode 17 remains illuminated until the manual reset switch 80 resets R input 74 establishing Q output 75 once again at a low level.

At times it is desirable to be able to reset the unexpected pulse detecting means automatically without having to reset the manual reset switch 80. One way of achieving this is by the automatic reset means shown in the FIGURE comprising capacitor 115, resistor 116, pulse shaper 100, and NAND gate 110. The pulse shaper at its auxiliary input 102 will sink the current from the 5 volt supply through resistor 116 to ground while inputs 101 are at a low level. When an unexpected pulse occurs and output 75 switches to a high level, the high level is impressed upon inputs 101 of pulse shaper 100. At this time, diode 17 is illuminated and the power from the 5 volt supply through resistor 116 can no longer be dissipated by the pulse shaper. Therefore, the current flowing through resistor 116 charges capacitor 115. When capacitor 115 has been charged to a high level, output 103 of pulse shaper 100 will attain the high level which is impressed upon inputs 111 of NAND gate 110 which caused a low level at output 112. The low level at output 112 is translated to pole 85 of switch 84 and resets R input 74.

Q output will again be at the low level state turning off diode 17 which will not be turned on again until another pulse occurs at clock input 76. In a preferred form, capacitor 115 has a value of 100 microfarads and resistor 116 has a value of 22,000 ohms which provides a one second reset time. In other words, diode 17 is sustained for one second providing sufficient time to detect the occurrence of an unexpected pulse.

The present invention provides a test circuit for detecting the level conditions of digital equipment. The present invention provides a positive indication of each possible level or level change. It not only provides a positive indication or a low level and high level static state, but also provides a positive unambiguous indication of an open level condition at the probe. Additionally, the test circuit provides a means for allowing dynamically changing levels to be readily observed and also a means for determining the approximate duty cycle of the pulse trains. Lastly, the invention provides the distinct advantage for detecting an unexpected pulse by providing a sustained indication together with the added feature for automatically resetting the pulse detecting means.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. A test circuit for detecting low, high and open static voltage levels or dynamically changing voltage levels at any given point of a digital circuit comprising:

an electrically conductive probe;
a display panel including
   a. a low level voltage indicator
   b. a high level voltage indicator
   c. an open voltage indicator
   d. a pair of dynamic voltage indicators and
   e. a change-of-voltage indicator;
a low level voltage detector coupled between said probe and said low level indicator for activating said low level indicator when said probe detects a low level voltage;
a high level voltage detector coupled between said probe and said high level indicator and including means responsive to current flow in said probe for activating said high level indicator when said probe detects a current flow and a high level voltage;
open level control means having a first input coupled to said low level detector and a second input coupled to said high level detector and an output coupled to said open voltage indicator for activating said open voltage indicator when there is an absence of a low and a high level indication at the outputs of said low level detector and said high level detector;
a dynamic voltage detector between said probe and said dynamic voltage indicators for activating said dynamic voltage indicators when the levels at said probe are dynamically changing; and
a change-of-voltage detector coupled between said probe and said change-of-voltage indicator for activating and causing it to provide a sustained indication when a voltage change occurs at said probe; whereby, said open voltage indicator provides a separate positive indication of an open voltage, and said change-of-voltage indicator provides a sustained indication of a voltage change to allow it to be readily observed.

2. A test circuit in accordance with claim 1 wherein said display panel indicators are light emitting diodes.

3. A test circuit in accordance with claim 1 wherein said low level voltage detector comprises a serially coupled inverter and NAND gate, the input of said inverter coupled to said probe and the output of said NAND gate coupled to said low level voltage indicator.

4. A test circuit in accordance with claim 1 wherein said means responsive to current flow comprises a pulse shaper conditioned to respond to current flow in said probe.

5. A test circuit in accordance with claim 1 wherein said high level voltage detector comprises a serially coupled inverter and first NAND gate, a second NAND gate and a pulse shaper responsive to current flow in said probe, the input of said inverter and an input of said pulse shaper coupled to said probe, the output of said first NAND gate coupled to an input of said second NAND gate, the output of said pulse shaper coupled to another input of said second NAND gate, and the output of said second NAND gate coupled to said high level voltage indicator.

6. A test circuit in accordance with claim 1 wherein said open level control means comprises a NAND gate.

7. A test circuit in accordance with claim 1 wherein said dynamic voltage detector comprises a first and second NAND gate and a flip-flop having a pair of outputs and a clock input coupled to said probe, said flip-flop being conditioned to provide at said outputs reciprocally changing high and low voltage levels in response to the level changes at said probe, each said flip-flop outputs coupled to the input of an assigned one of said NAND gates, and the output of each said NAND gate coupled to an assigned one of said pair of dynamic voltage indicators.

8. A test circuit in accordance with claim 1 wherein said change-of-voltage detector includes means for resetting itself after said indication has been sustained for a predetermined time period.

9. A test circuit in accordance with claim 1 wherein said change-of-voltage detector comprises a flip-flop having a clock input coupled to said probe and an output, and a NAND gate having an input and an output, said flip-flop output coupled to said NAND gate input, said NAND gate output coupled to said change-of-voltage indicator, and said flip-flop being conditioned to provide a sustained predetermined voltage level at said flip-flop output in response to the voltage level changes at said probe.

10. A test circuit in accordance with claim 9 wherein said change-of-voltage detector additionally includes a means for resetting itself comprising a pulse shaper having a first input coupled to said flip-flop output, a second input coupled to a source of electrical energy, and an output coupled to said flip-flop, said pulse shaper including means for providing at said output a resetting signal after said flip-flop output is sustained for a predetermined period of time.

* * * * *